(12) United States Patent
Fredriksson et al.

(10) Patent No.: US 6,412,466 B2
(45) Date of Patent: Jul. 2, 2002

(54) INTERNAL COMBUSTION ENGINE ARRANGEMENT

(75) Inventors: Göran Fredriksson; Mikael Jönsson, both of Göteborg (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/682,037

(22) Filed: Jul. 12, 2001

Related U.S. Application Data

(63) Continuation of application No. PCT/SE00/00031, filed on Jan. 12, 2000.

(30) Foreign Application Priority Data

Jan. 12, 1999 (SE) ................................................ 9900049

(51) Int. Cl.⁷ .............................................. F02M 35/10
(52) U.S. Cl. ............. 123/184.38; 123/456; 123/184.21
(58) Field of Search ....................... 123/184.38, 184.42, 123/456, 470

(56) References Cited

U.S. PATENT DOCUMENTS

| 4,909,221 | A | | 3/1990 | Heuser |
| 5,357,931 | A | | 10/1994 | Semence |
| 5,394,850 | A | | 3/1995 | Murphy et al. |
| 5,771,863 | A | | 6/1998 | Daly |
| 6,338,333 | B1 | * | 1/2002 | Brosseau et al. |

FOREIGN PATENT DOCUMENTS

WO     WO 8802067     2/1998

* cited by examiner

*Primary Examiner*—Willis R. Wolfe
*Assistant Examiner*—Katrina B. Harris
(74) *Attorney, Agent, or Firm*—Kilpatrick Stockton LLP

(57) ABSTRACT

An arrangement for internal combustion engines of the piston engine type having at least one row of cylinders is disclosed. The arrangement includes at least one fuel injector for each cylinder and at least one intake manifold for admission of air to the cylinders. The inlets of the fuel injectors are connected to a fuel channel arranged in the intake manifold.

10 Claims, 5 Drawing Sheets

INTERNAL COMBUSTION ENGINE ARRANGEMENT

CROSS REFERENCE TO RELATED APPLICATION

This is a continuation patent application of International Application Number PCT/SE00/00031 filed Jan. 12, 2000 that designates the United States. The full disclosure of said application, in its entirety, is hereby expressly incorporated by reference into the present application.

BACKGROUND OF THE INVENTION

1. Technical Field

The present invention relates to an arrangement for internal combustion engines of the piston engine type having at least one row of cylinders. The arrangement has at least one fuel injector for each cylinder and at least one intake manifold for admission of air to the cylinders.

2. Background Art

Nearly all vehicles are equipped with an internal combustion engine or diesel engine. Today's internal combustion engines, which run on gasoline, are provided with fuel injectors in contrast to carburetors for older engines. This is due to the increasingly stringent requirements regarding exhaust gas. An engine that has become more common recently is one having injectors that injects the fuel directly into the cylinder, known as direct injection. This type of engine permits lean running. However, direct injection engines have a construction-related problem in finding room on the engine's cylinder head for the injectors and their admission lines, together with intake manifolds and other lines arranged around the cylinder head. The intake manifolds themselves take up a substantial amount of room, requiring perhaps several ports per cylinder, exhaust gas recirculation ("EGR") inlets, valves, and pipes with selectable airways. In this context, use is often made of a fuel pipe system having a feed pipe to the side of the engine and narrow lines from the feed pipe to the injectors. These are relatively costly constructions since the demands on compactness and strength in this environment are high. Direct injection is also found on diesel engines, which have similar problems.

SUMMARY OF THE INVENTION

The present invention provides a solution to the above problems. In the invention, the inlets of the fuel injectors are connected to a fuel channel arranged in the intake manifold. The fuel channel is advantageously integrated in the intake manifold construction, with the inlets of the injectors preferably connected to openings adapted for them in the intake manifold.

A particularly advantageous embodiment has the intake manifold divided into two parts. The first part accommodates the fuel channel and the attachments to the fuel injectors, and the second part constitutes the rest of the intake system with, inter alia, the pipes. At the end facing away from the engine, the intake manifold may be designed with an attachment to an air-cleaning system or the like. One advantage of dividing an intake manifold in two is that the first part can be made of a material well suited for the special material treatment that is needed, while the other part can be made of a material with lower requirements, i.e., a less expensive material. The first part may be coupled to the fuel injectors with their associated demands, such as leak tightness and, therefore, surface fineness in the openings where the injectors are attached. The handling of the work pieces during material treatment is also made easier by the fact that the part which is treated is smaller than a complete intake manifold, e.g., if the material is to be treated in a furnace. It is also expedient to accommodate in the first part valves for swirl effect, since assembly is simpler.

BRIEF DESCRIPTION OF THE DRAWINGS

The invention will be described and explained below with reference to the figures shown in the attached drawings, in which.

DETAILED DESCRIPTION

Figure 1:
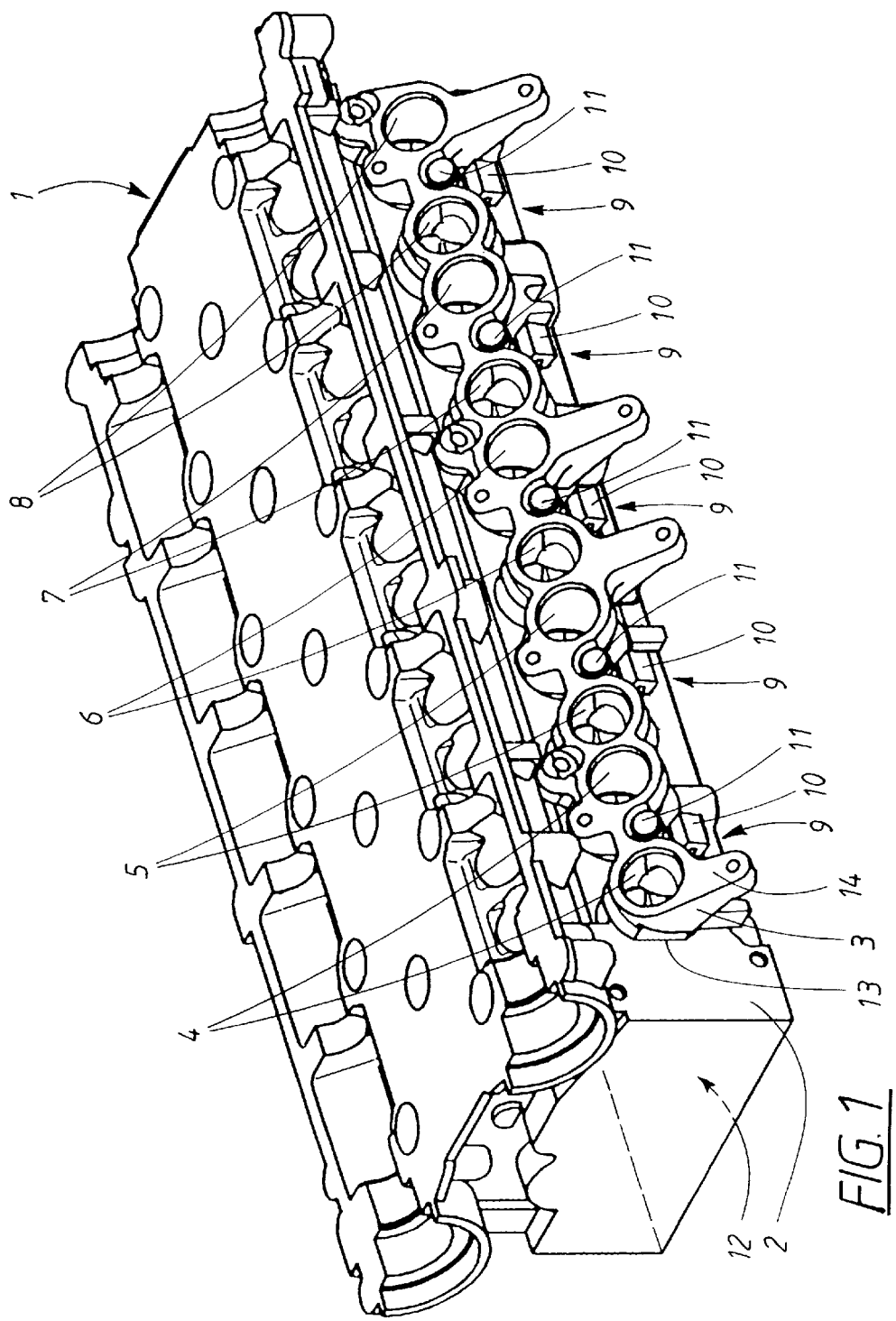
FIG. 1 illustrates a perspective view of a cylinder head of an engine according to the invention, with attached fuel injectors.

FIG. 1 is a perspective view of a conventional cylinder head 1 intended for a customary double overhead camshaft. The valve cap, camshafts, valve mechanisms and their associated bearings and bearing covers have been omitted since they do not pertain to the invention.

The cylinder head 1 is intended for an engine with five cylinders. However, the invention should not be interpreted as being limited to five cylinders. Each cylinder has two inlet ports for air (concealed in the figure), which are connected to an adapter part 3 that belongs to the intake manifold construction and extend along the side 2 of the cylinder head. The adapter part 3 has inlet channels 4, 5, 6, 7 and 8 that are connected in pairs to the inlet ports of the engine. A fuel injector 9 is mounted between the channels in each pair of inlet channels, (here, a total of five fuel injectors). The fuel injectors 9, which may be any known type available on the market, have an electrical connection 10 for a control signal and a circular-cylindrical fuel inlet 11. Depending on the desired injection angle in the cylinder, the fuel injectors 9 and their inlets 11 have a direction that is angled in relation to the cylinder head's connection plane to the engine and the main axis of the engine cylinders. On the cylinder head 1 shown in the figure, the connection plane faces downwards and is indicated by an arrow labeled 12.

Along the engine, the adapter part 3 is designed with first and second connection planes 13 and 14. The first plane 13 is connected to a corresponding plane on the side 2 of the cylinder head 1 so that the cylinder inlet ports opening out in the side of the cylinder head connect to and continue in the inlet channels 4–8. The second connection plane 14 is arranged at an angle to the first connection plane 13 such that the connection plane 14 lies at right angles to the direction of the fuel inlet 11.

Figure 2:
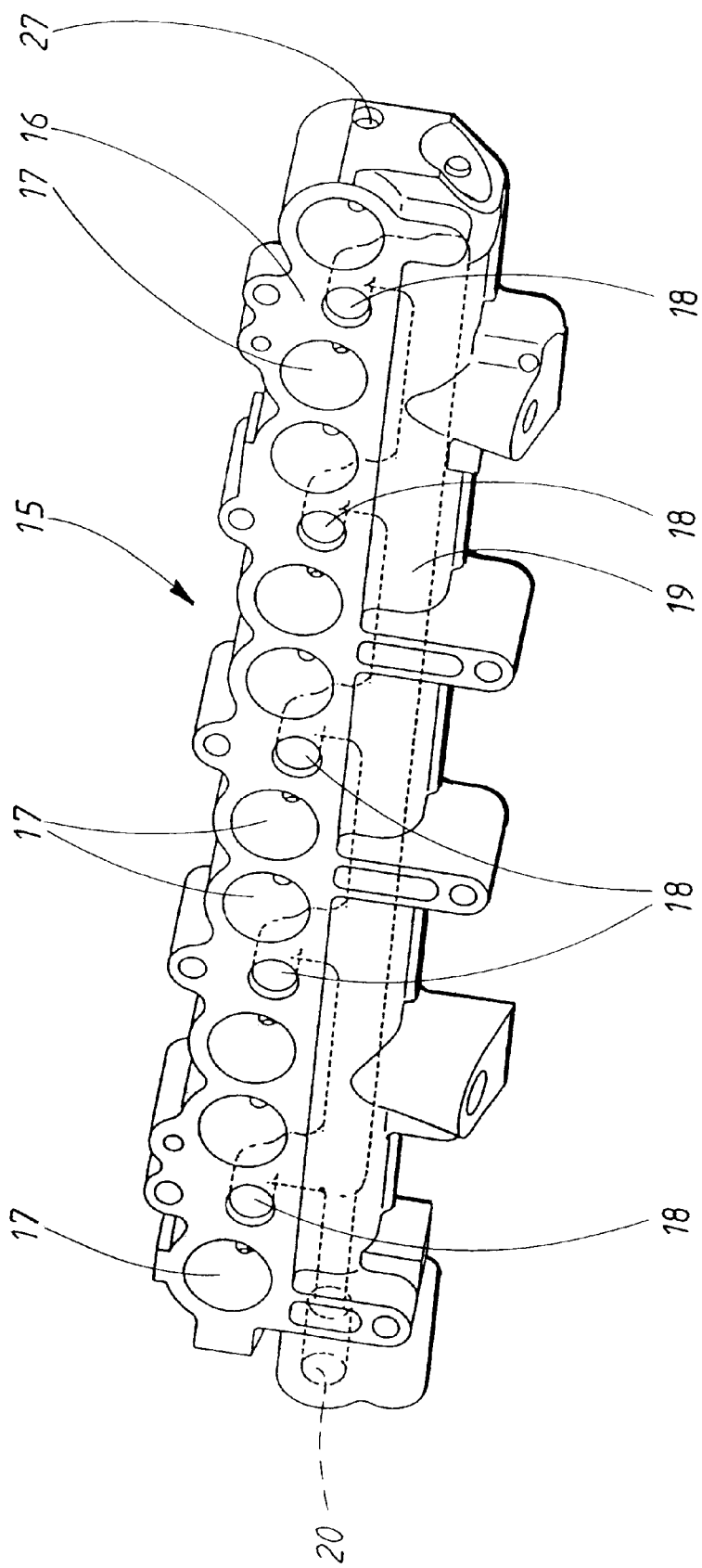
FIG. 2 illustrates a perspective view of a first intake manifold part from the side intended to be connected to the intake side of the cylinder head and the fuel injectors.

FIG. 2 illustrates a first, inner part 15a of an intake manifold 15 whose side 16 shown in the figure has one or more inlet openings 17 and one or more fuel holes 18 corresponding to the inlet channels 4–8 of the second connection plane 14 and the fuel inlets 11 of the injectors 9. The fuel holes 18 are in direct communication with a fuel channel 19 (shown diagrammatically) that is integrated in the part 15a and that in turn receives fuel from a feed line (not shown) via a fuel inlet 20.

Figure 3:
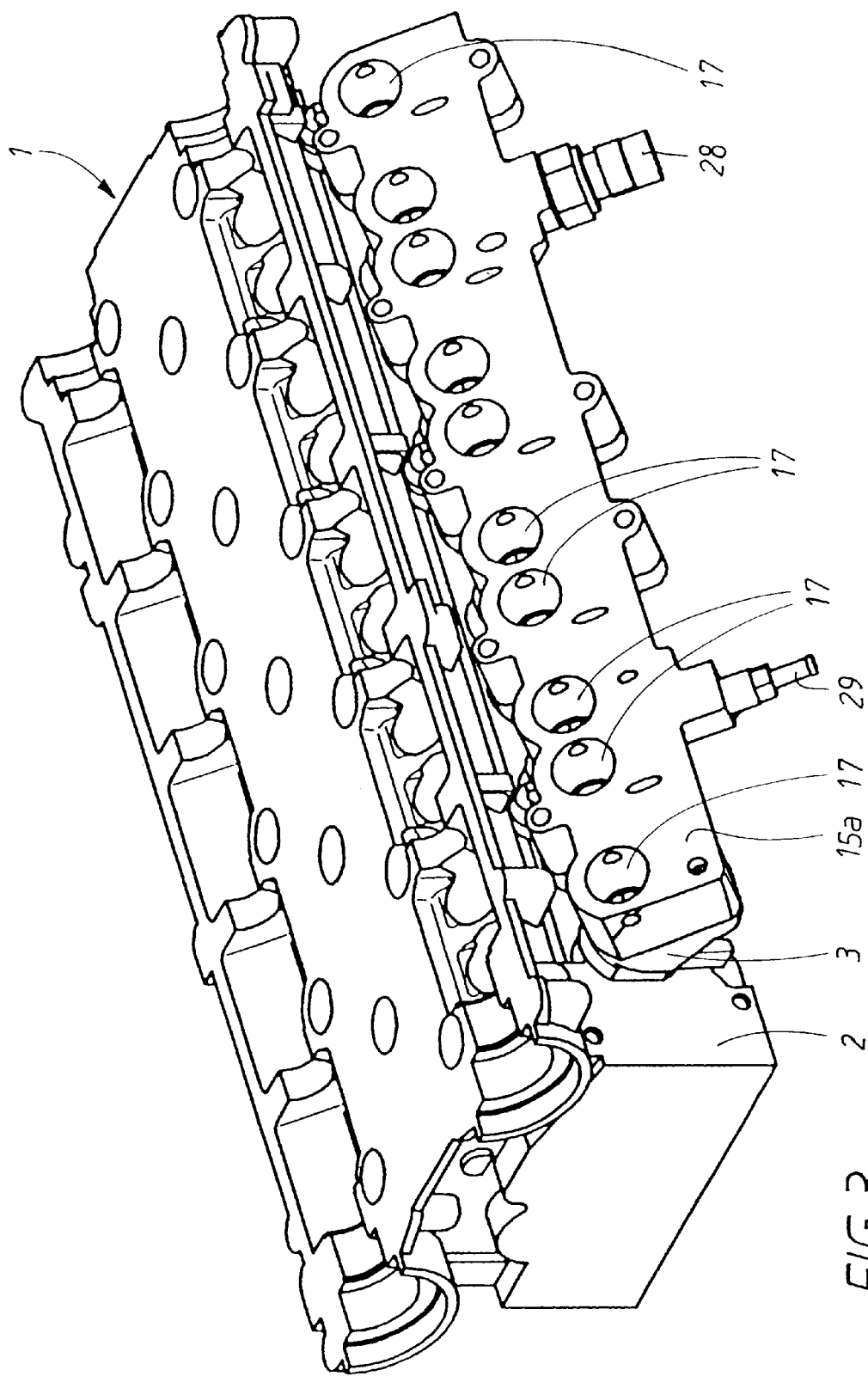
FIG. 3 shows the same cylinder head as in FIG. 1, with an attached first portion of an intake manifold according to FIG. 2.

FIG. 3 shows the first part 15a of the intake manifold 15 mounted on the adapter 3. The inlet openings 17 are arranged in such a way that they have a direct continuation in the inlet channels 4–8. On that side of the intake manifold part 15a directed towards and connected to the adapter part 3, the fuel inlets 11 of the fuel injectors 9 are connected to corresponding fuel holes 18 in the part 15a. By virtue of the fact that the connection plane 14 is at right angles to the direction of the fuel inlets 11 on the injectors 9, there is no uneven loading of the injectors 9 from the intake manifold 15a. Normally, the injectors 9 are secured to the cylinder head 1 by bolts or in a similar manner. However, it is also possible for them to be held secure solely by having the intake manifold 15a lie on the outside via support surfaces (not shown) that are arranged on the bottom of the fuel holes 18 and that bear against the fuel inlets 11 of the injectors. A pressure sensor 28 and safety valve 29 for the fuel are also connected to the part 15a.

Figure 4:
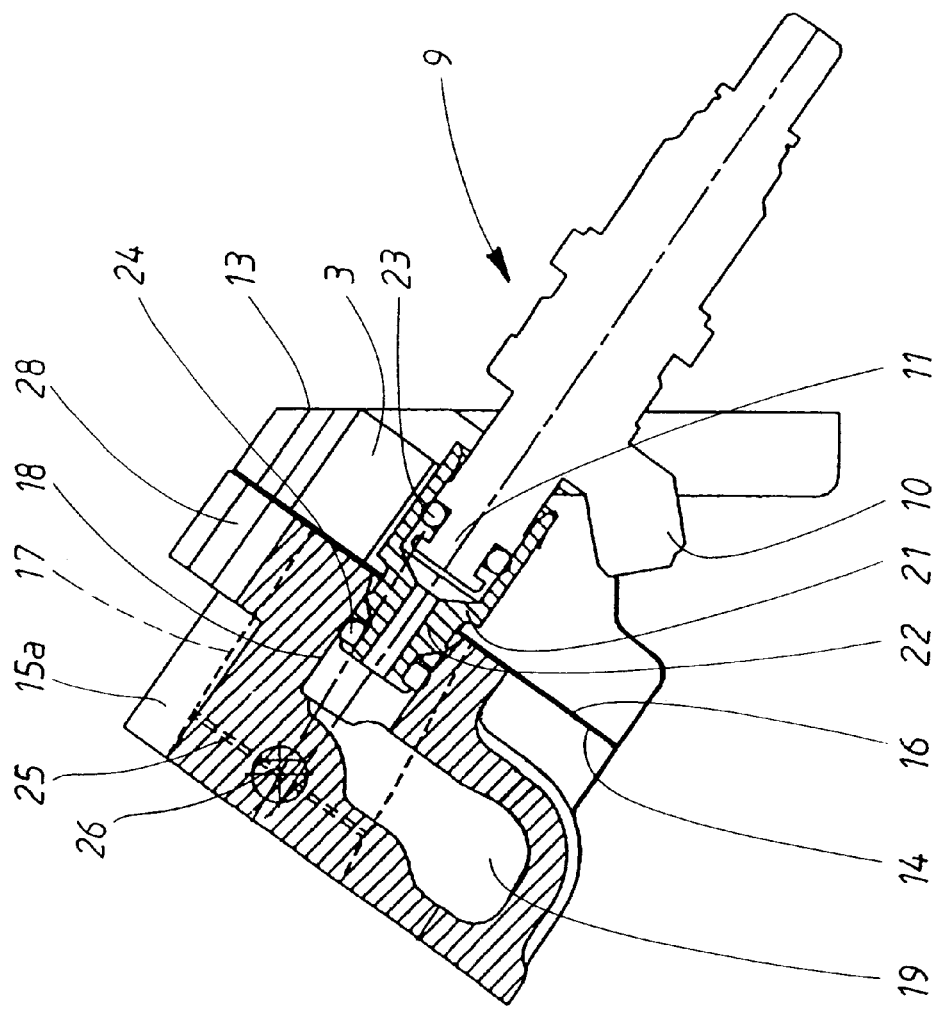
FIG. 4 shows a cross-section view through a fuel injector and its connection to a fuel channel in the intake manifold.

FIG. 4 shows a cross-section of a fuel injector 9 and its attachment to the intake manifold part 15a. An extension part 21 with a portion 22 inserted into a fuel hole 18 is connected coaxially to the fuel inlets 11 of the injectors. Arranged between the extension part 21 and the outside of the inlet 11 of the fuel injector, and between the portion 22 of the extension part and the inside of the fuel hole 18 of the intake manifold part 15a, are sealing rings 23 and 24, respectively. This construction affords a tolerance-absorbing effect between the inlets 11 of the fuel injectors and the fuel holes 18 in the intake manifold 15a. The figure also shows an inlet port 17, indicated by broken lines. A swirl valve 25 is shown diagrammatically in the port 17. The swirl valve 25 can be controlled in a known manner via a diagrammatically represented control rod 26 in a rod hole 27 (see, FIG. 5). Swirl valves are arranged in one of the two inlet ports 17 belonging to each cylinder. A bolthole 28 for attachment of the adapter part 3 is also shown.

Figure 5:
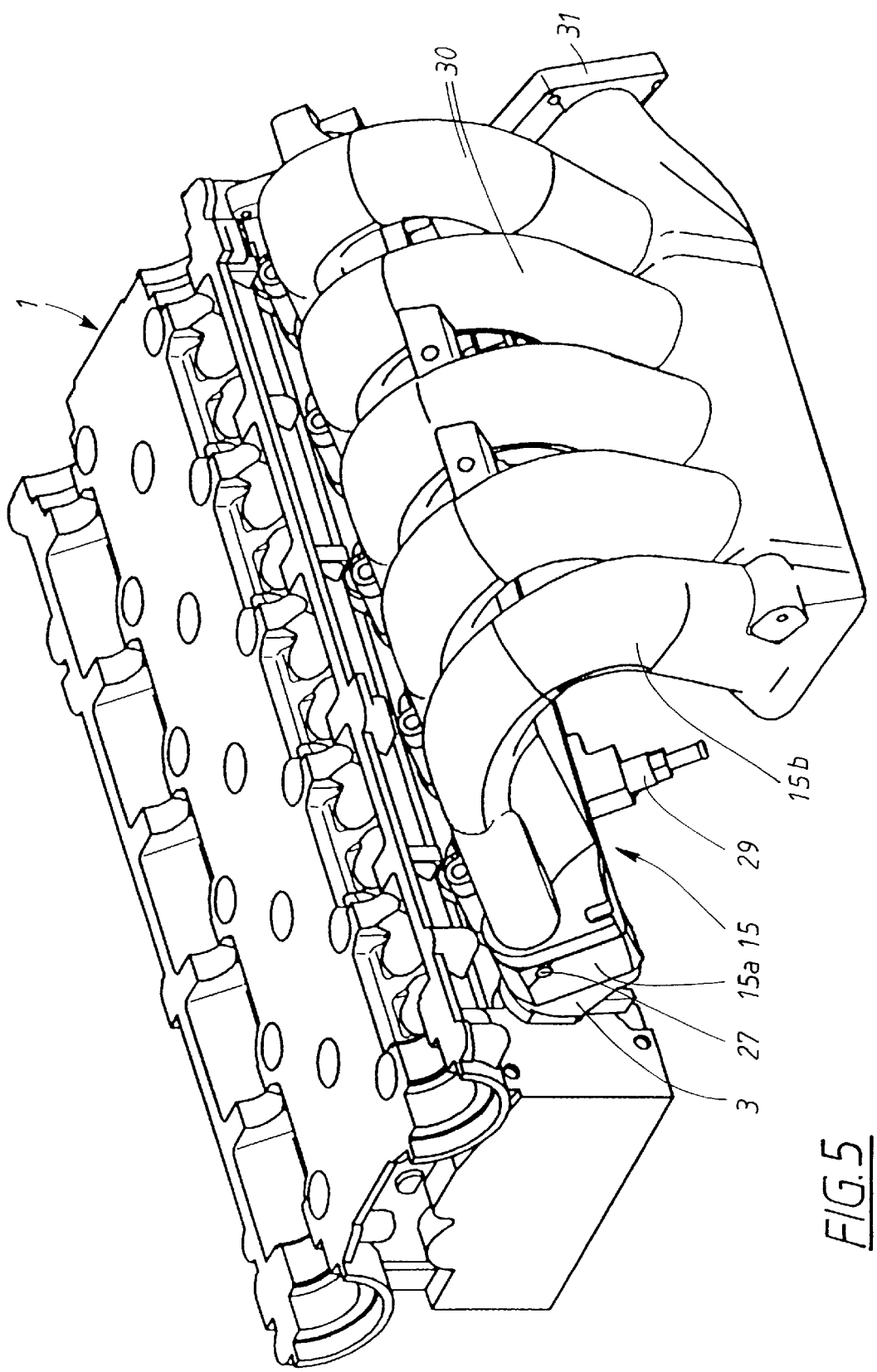
FIG. 5 again shows the same cylinder head as in FIGS. 1 and 3, but with a complete intake manifold according to the invention fitted on it.

The intake manifold 15 is completed in FIG. 5 by an outer part 15b that comprises pipes 30, one pair for each cylinder, and a connection 31 to the air supply system, valve housing and similar components normally belonging to a car engine.

The part 15a of the intake manifold 15 connected to the fuel injectors 9 must, in the fuel holes 18 connected to the inlets 11 of the fuel injectors 9, have a surface fineness that ensures that no leakage occurs. It is also important that the walls in the intake manifold 15 withstand the fuel pressure while at the same time are as thin as possible in order to take up the least possible space and have the lowest possible weight. A suitable material for the pipe is aluminum, which can be chilled-cast. Thixocasting can also be used, and hot isostatic pressing ("HIPping") to have the pores pressed together. In these treatments it is a great advantage that the work pieces are not unnecessarily large and unwieldy. In addition, a less expensive material can be chosen for the part 15b, which does not need to meet stringent specifications.

Other embodiments of the present invention include, for example, integrating the intake manifold into a single piece comprising the adapter 3, the inner part 15a and the outer part 15b in a design with the fuel holes 18 arranged directly on the inlets 11 of the fuel injectors. It is also possible to integrate only the adapter part 3 and the inner part 15a, and it is likewise possible for the adapter part to be integrated in the cylinder head, i.e., the cylinder head is designed with a connection plane 2 at right angles to the direction of the inlets of the fuel injectors.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. An arrangement for internal combustion engines, the engine being a multi-cylinder piston engine having at least one row of cylinders, the arrangement comprising:
   at least one fuel injector for each cylinder,
   at least one intake manifold for admission of air to said cylinders, and
   at least one fuel channel being integral with said intake manifold,
   wherein said at least one fuel injector is mounted at a cylinder head between the head and the intake manifold, and
   wherein the inlets of the fuel injectors are connected to the fuel channel arranged in the intake manifold.

2. The arrangement according to claim 1 wherein said intake manifold further comprises:
   a first inner part located nearest to the engine accommodating the fuel channel, and
   a second outer part connected to the first part and comprising intake pipes.

3. The arrangement according to claim 2 wherein said first part accommodates valves for controlling swirl effect.

4. The arrangement according to claim 2 wherein said first part is connected to said fuel injectors and engine intake ports.

5. The arrangement according to claim 2, said second part further comprising a connection to an air-cleaning system.

6. The arrangement according to claim 1 wherein the fuel inlet of said at least one fuel injector is connected via an extension part to the channel arranged in said intake manifold.

7. The arrangement according to claim 1 wherein the fuel injectors are held securely in the cylinder head by the intake manifold.

8. The arrangement according to claim 1 wherein the surface of the cylinder head connecting to the intake manifold is at right angles to the direction of the fuel inlets of the fuel injectors.

9. A vehicle engine arranged according to the arrangement of claim 1.

10. A vehicle comprising a vehicle engine arranged according to the arrangement of claim 1.

* * * * *